United States Patent
Chao et al.

[11] Patent Number: 6,012,811
[45] Date of Patent: *Jan. 11, 2000

[54] EYEGLASS FRAMES WITH MAGNETS AT BRIDGES FOR ATTACHMENT

[75] Inventors: David Chao, Towson, Md.; Richard Chao, Chia Yi Hsien, Taiwan

[73] Assignee: Contour Optik, Inc., Chiayi, Taiwan

[ * ] Notice: This patent is subject to a terminal disclaimer.

[21] Appl. No.: 08/963,299

[22] Filed: Nov. 3, 1997

Related U.S. Application Data

[63] Continuation-in-part of application No. 08/766,327, Dec. 13, 1996, Pat. No. 5,737,054, application No. 08/847,711, Apr. 28, 1997, and application No. 08/865,379, May 29, 1997, Pat. No. 5,786,880.

[51] Int. Cl.⁷ ..................................................... G02C 7/08
[52] U.S. Cl. .............................................. 351/47; 351/57
[58] Field of Search .................................. 351/47, 57, 41, 351/58, 48, 106, 158; 2/441, 443

[56] References Cited

U.S. PATENT DOCUMENTS

| | | | |
|---|---|---|---|
| 2,737,847 | 3/1956 | Tesauro | 351/41 |
| 2,770,168 | 11/1956 | Tesauro | 351/41 |
| 3,498,701 | 3/1970 | Miller | 351/57 |
| 3,531,188 | 9/1970 | LeBlanc et al. | 351/48 |
| 3,565,517 | 2/1971 | Gitlin et al. | 351/106 |
| 3,582,192 | 6/1971 | Gitlin et al. | 351/52 |
| 3,838,914 | 10/1974 | Fernandez | 351/106 |
| 4,070,103 | 1/1978 | Meeker . | |

(List continued on next page.)

FOREIGN PATENT DOCUMENTS

| | | |
|---|---|---|
| 76209045 | 9/1976 | China . |
| 1117593 | 2/1996 | China . |
| 1061253 | 4/1954 | European Pat. Off. . |
| 0469699 | 2/1992 | European Pat. Off. . |
| 0743545 | 11/1996 | European Pat. Off. . |
| 915421 | 11/1946 | France . |

(List continued on next page.)

OTHER PUBLICATIONS

English language abstract of Japanese Publication No. 55–50217.
English language abstract of Japanese Publication No. 54–111842.
English language abstract of Japanese Publication No. 54–111841.

(List continued on next page.)

*Primary Examiner*—Hung Xuan Dang
*Attorney, Agent, or Firm*—Fliesler, Dubb, Meyer & Lovejoy, LLP

[57] ABSTRACT

A first frame of an eyeglass device includes a bridge with a magnetic member, and two retaining mechanisms for supporting a pair of lenses. The retaining mechanisms defines a frontal plane. The bridge ties the two retaining mechanism together, with the magnetic member magnetically coupling to another magnetic member at the bridge of a second frame. In one embodiment the coupling occurs at a coupling surface on the second frame that is substantially perpendicular to the frontal plane. The magnetic member at the bridge of the first frame can be a permanent magnet or a magnetizable member. The second frame can be a primary frame, and the first frame can be an auxiliary frame.

35 Claims, 7 Drawing Sheets

U.S. PATENT DOCUMENTS

| | | | | |
|---|---|---|---|---|
| 4,196,981 | 4/1980 | Waldrop | ................................... | 351/59 |
| 4,547,909 | 10/1985 | Bell | ............................................ | 2/431 |
| 4,988,181 | 1/1991 | Riach | ....................................... | 351/52 |
| 5,181,051 | 1/1993 | Townsend et al. | ....................... | 351/52 |
| 5,243,366 | 9/1993 | Blevins | ..................................... | 351/57 |
| 5,321,442 | 6/1994 | Albanese | .................................. | 351/44 |
| 5,389,981 | 2/1995 | Riach | ..................................... | 351/158 |
| 5,410,763 | 5/1995 | Bolle | .......................................... | 2/436 |
| 5,416,537 | 5/1995 | Sadler | ........................................ | 351/57 |
| 5,642,177 | 6/1997 | Nishioka | .................................. | 351/63 |
| 5,737,054 | 4/1998 | Chao | ......................................... | 351/47 |

FOREIGN PATENT DOCUMENTS

| | | |
|---|---|---|
| 1037755 | 9/1953 | France . |
| 2483632 | 4/1981 | France . |
| 1266652 | 12/1981 | France . |
| 2657436 | 7/1991 | France . |
| 1797366 | 1/1971 | Germany . |
| 85 07 761 U | 6/1985 | Germany . |
| 88 06 898 U | 10/1988 | Germany . |
| 3905041 | 8/1990 | Germany . |
| WO 90/09611 | 8/1990 | Germany . |
| 3919489 | 12/1990 | Germany . |
| 3920879 | 1/1991 | Germany . |
| 3921987 | 1/1991 | Germany . |
| 39333310 | 1/1991 | Germany . |
| 9216919 | 2/1993 | Germany . |
| 43 16 698 | 11/1994 | Germany . |
| 44-15392 | 7/1969 | Japan . |
| 54-111841 | 9/1979 | Japan . |
| 54-111842 | 9/1979 | Japan . |
| 55-50217 | 4/1980 | Japan . |
| 56-29209 | 3/1981 | Japan . |
| 57-184910 | 11/1982 | Japan . |
| 61-2621 | 1/1986 | Japan . |
| 1-136114 | 5/1989 | Japan . |
| 2-109325 | 8/1990 | Japan . |
| 5-157997 | 6/1993 | Japan . |
| 5-40493 | 10/1993 | Japan . |
| 7-128620 | 5/1995 | Japan . |
| 220885 | 6/1968 | Russian Federation . |
| 572222 | 1/1976 | Switzerland . |
| 274588 | 4/1996 | Taiwan . |
| 846425 | 8/1960 | United Kingdom . |
| 855268 | 11/1960 | United Kingdom . |
| WO 90/09611 | 8/1990 | WIPO . |

OTHER PUBLICATIONS

English language abstract of Japanese Publication No. 1–136114.

English language abstract of Japanese Publication No. 56–29209.

English language abstract of Japanese Publication No. 44–15392.

English language abstract of Japanese Publication No. 5–157997.

English language abstract of Japanese Publication No. 612621.

English language abstract of Japanese Publication No. 5–40493.

English language abstract of German Publication No. 9216919.

English language abstract of German Publication No. 1797366.

English language abstract of German Publication No. 43 16 698.

English language abstract of German Publication No.39333310.

English language abstract of German Publication No. 3921987.

English language abstract of German Publication No. 3920879.

English language abstract of German Publication No. 391489.

English language abstract of German Publication No. 3905041.

English language abstract of French Publication No. 1266652.

English language abstract of French Publication No. 1037755.

English language abstract of French Publication No. 2,657, 436.

English language abstract of French Publication No. 2,483, 632.

English language abstract of French Publication No. 915, 421.

English language abstract of Switzerland Publication No. 572,222.

English language abstract of Russian Publication No. 220885.

English language abstract of Taiwan Publication No. 274588.

English language abstract of Chinese Publication No. 1117593.

Documents describing Twincome in a Patent Opposition Proceeding in Germany initiated by Pentax, on or around Apr. 30, 1997.

EYEGLASS FRAMES WITH MAGNETS AT BRIDGES FOR ATTACHMENT

CROSS REFERENCE TO RELATED APPLICATION

This is a continuation-in-part of U.S. patent application Ser. No. 08/766,327, filed on Dec. 13, 1996 now U.S. Pat. No. 5,737,054, co-pending U.S. patent application Ser. No. 08/847,711, filed on Apr. 28, 1997 and U.S. patent application Ser. No. 08/865,379, filed on May 29, 1997 now U.S. Pat. No. 5,786,880 all incorporated by reference into this specification

BACKGROUND OF THE INVENTION

The present invention relates generally to eye-wear and more particularly to eye-wear using magnets for attachment.

Auxiliary frames with lenses have been used for decades to augment deficiencies in primary frames. For example, the auxiliary frames may be for magnifying purposes, or may transform the primary frames into sunglasses.

For decades, people around the world have been creating numerous ingenious methods to attach the auxiliary frames onto the primary frames. In one line of approaches, the auxiliary frames are clipped onto the lenses of the primary frames. Not only do such clips obstruct the wearer's vision, they may scratch the lenses of the primary frames. To alleviate the defect of view obstruction, there are designs using small clips at the edges of the frames. However, these small clips still create scratches on the lenses and the primary frames, and attaching these auxiliary frames with small clips requires some maneuvering with two hands, and it would not be easy to do so, for example, if one is driving. Also, to detach such an auxiliary frame from its primary frame, one typically have to push down at its bridge and warp the frames outward on both sides of the lenses. It is not uncommon for such actions to permanently deform the auxiliary frame.

Another approach uses two pairs of magnets instead of clips, with one pair on the primary frame and the other on the auxiliary frame. The magnets are located on the plane of the lenses, and are close to the temples of the frames. Since they are on the plane of the lenses, they have to be carefully designed so that they can blend into the general style of the frame, without being too conspicuous. One way is to make the magnets very small. With gravity pulling the auxiliary frame away from its primary frame, the magnets have to be of certain size so as to have sufficient magnetic power to hold the auxiliary frame to the primary frame.

One reason for the magnets to be close to the temples is that the pair of magnets on a frame should be as far apart as possible. This is to ensure the auxiliary frame to be right over the primary frame, not only at the locations close to the bridges of the frames, but also at the locations close to the arms of the frames. However, in order to have sufficient coupling power, the magnets on the auxiliary frame have to match in both locations and orientations to the magnets on the primary frame. This is not an easy task, especially because the magnets are typically very small for stylistic reasons.

The further away the pair of magnets are on a frame, the more difficult it is to align them in both locations and orientations to magnets on another frame. First, imagine the magnets in a primary frame are slightly off in locations from those in an auxiliary frame. Since the magnets are quite small, slight misalignment in the locations would significantly reduce magnetic coupling between the frames. Next, imagine one small magnet in the primary frame is different in orientation from its corresponding magnet in the auxiliary frame. This can happen, for example, if the auxiliary frame has been slightly twisted—the magnitude of the difference is proportional to the distance between the pair of magnets on the frame. Two magnets may not even be able to couple together if they have different orientations. Misalignment in locations or orientations not only adversely affects the coupling power of the auxiliary frame to the primary frame, but also creates an unpleasant outward appearance for the wearer, especially when the auxiliary frame is tilted relative to the primary frame.

It should be apparent from the foregoing that there is a need for improved methods and apparatus to attach auxiliary frames to primary frames so that auxiliary frames can be easily, firmly and elegantly attached to primary frames.

SUMMARY OF THE INVENTION

The present invention provides methods and apparatus to easily, firmly and elegantly attach auxiliary frames to primary frames, based on magnetic members at the bridges of frames. The invention has numerous advantages. For example, it creates a very strong support for attaching auxiliary frames to primary frames, it is relatively easy to manufacture, it is easier to blend into the general design of frames, and it makes the auxiliary frames easily applicable to primary frames even with just one hand.

In one embodiment, the magnet at the auxiliary frame does not couple to the magnet at the primary frame on the plane of the lenses or the frontal plane. Instead, the magnet at the bridge of the auxiliary frame sits on the magnet at the primary frame. Coupling at a different plane, based on the present invention, reduces the difficulty in aligning the auxiliary frame over the primary frame, not only at the locations close to the bridges of the frames, but also at the locations close to the arms of the frames.

With the magnetic members at the bridges, there are many other advantages. The magnets are much less conspicuous than magnets disposed on the plane of lenses, making them easier to design and to blend them into the general style of frames. Gravity, instead of adversely affecting the coupling of the auxiliary frames to the primary frames, helps to keep them together.

Also, even if there are more than one magnet at a bridge, since the bridge is short, the magnets are in close proximity. This reduces the difficulty in aligning the locations and the orientations of the magnets in the auxiliary frame to those in the primary frame. In one embodiment where soldering is required, one only has to solder the bridge to the retaining mechanisms holding the lenses. This requires four soldering steps for both the auxiliary and primary frames: Two for the bridge at the primary frame to the two retaining mechanisms on either end of the bridge, and two for the bridge at the auxiliary frame to its retaining mechanisms. However, if the magnets are at the temples on the arms of the primary frame, one probably has to perform eight soldering steps: Two for the bridge at the primary frame to the two retaining mechanisms, two for the bridge at the auxiliary frame to its two retaining mechanisms, two for the retaining mechanisms to their corresponding arms for the primary frame, and two for the retaining mechanisms to their corresponding short arms for the auxiliary frame. With more soldering required, it is more difficult to match the locations and orientations of magnets.

In one embodiment, before magnets are assembled into the bridges, the bridges of both the primary and the auxiliary frames are made together, in one molding process. In another embodiment, both types of bridges are generated from the same mold before they are connected to their corresponding retaining mechanisms. Such manufacturing processes significantly enhance the matching in locations and orientations of the magnets in the auxiliary frame to those in the primary frame. Moreover, such manufacturing processes enhance the matching in the curvatures of the bridges of the primary frames to the curvatures of the bridges of the auxiliary frames.

Not only is the present invention more elegant, easier to design, easier to manufacture and more secure in attachment than prior art approaches, a person can easily use one hand to attach an auxiliary frame onto a primary frame of the present invention.

In one embodiment, a first frame of an eyeglass device includes a bridge with a magnetic member, and two retaining mechanisms for supporting a pair of lenses. The retaining mechanisms defines a frontal plane, which is the plane of the lenses, or the plane in front of the face of a wearer of the eyeglass device. The bridge connects the two retaining mechanism and holds them together. The magnetic member at the bridge magnetically couples to another magnetic member at the bridge of a second frame. The coupling can occur at a coupling surface on the second frame that is substantially perpendicular to the frontal plane. When coupled, the second frame is attached to the first frame. Due to the location of the coupling, one of the frames is restricted from moving downwards relative to the other frame. The magnetic member at the bridge of the first frame can be a permanent magnet.

In another embodiment, the magnetic member at the bridge of the first frame is in the shape of a cavity so as to receive the second frame's magnetic member, which is in the shape of a protrusion that can fit into the cavity. In yet another embodiment, the magnetic member at the bridge of the first frame comprises two separate parts, with each part being adjacent to one of the retaining mechanisms.

The second frame can be the primary frame, and the first frame can be the auxiliary frame. In one embodiment, the auxiliary frame further includes a flange that extends from the bridge of the frame to further secure the attachment of the auxiliary frame to the primary frame. The flange can generally be in the lateral or in the vertical direction relative to the bridge.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIGS. 8–9A, 9B show embodiments of the present invention where the bridges include a cavity and a protrusion.

Same numerals in FIGS. 1–16 are assigned to similar elements in all the figures. Embodiments of the invention are discussed below with reference to FIGS. 1–16. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
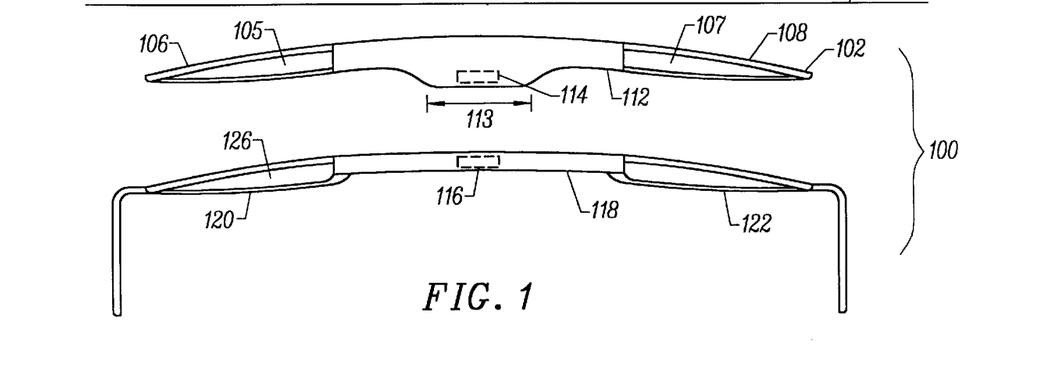
FIG. 1 shows the top view of an auxiliary frame and a primary frame in a first embodiment of the present invention.

FIG. 1 shows the top view of an auxiliary frame 102 and a primary frame 104 in a first embodiment 100 of the present invention. In order to better illustrate the present invention, many components are not shown in the figure.

Figure 3:
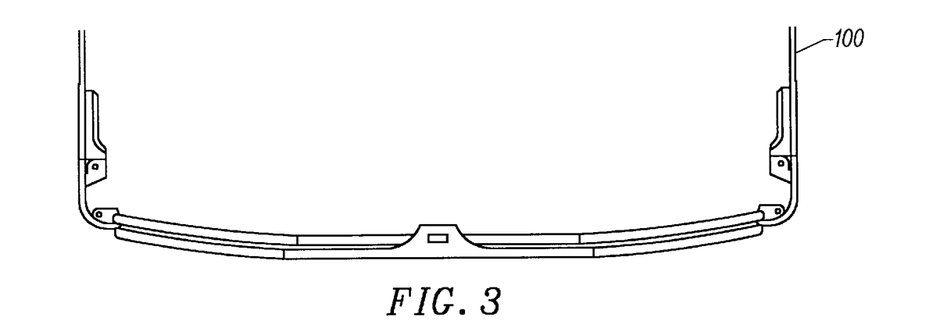
FIG. 3 shows the top view of the auxiliary frame attached to the primary frame in the first embodiment of the present invention.

The auxiliary frame 102 includes two retaining mechanisms, 106 and 108, a bridge 112, and a magnetic member 114. The retaining mechanisms support a pair of auxiliary lenses, 105 and 107, and defines a frontal plane 110, which is the plane in front of the face of a wearer of the embodiment 100. The bridge 112 connects the two retaining mechanisms and holds them together. The magnetic member 114 at the bridge 112 of the auxiliary frame 102 magnetically couples to another magnetic member 116 at the bridge 118 of the primary frame 104. In one embodiment, the magnetic member 114 of the auxiliary frame is located in an extension, which extends slightly over and sits on the bridge of the primary frame as shown in FIG. 3. As an example, the width 113 of the extension is about 10 mm. In one embodiment, the surface area of the bridge of the auxiliary frame is more than 28 mm square.

The primary frame 104 also includes two retaining mechanisms, 120 and 122, for supporting a pair of primary lenses, 124 and 126. The bridge 118 at the primary frame 104 connects the two retaining mechanisms, 120 and 122, and holds the two mechanisms together.

Figure 2:
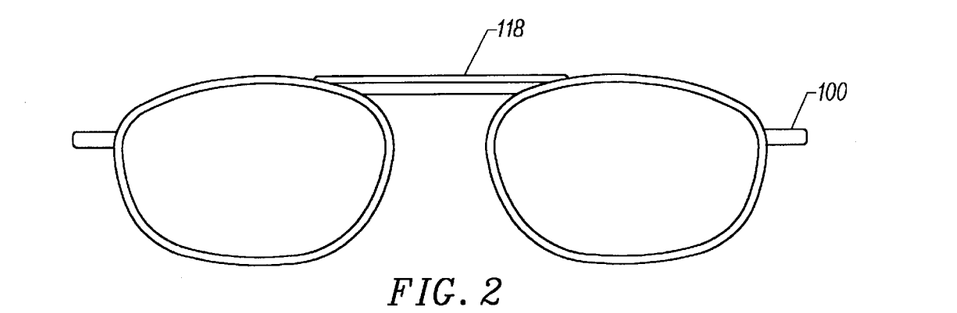
FIG. 2 shows the front view of the first embodiment.

FIG. 2 shows the front view of the first embodiment with the auxiliary frame 102 magnetically coupled to the primary frame 104, while FIG. 3 shows the top view. As shown in the figures, due to the location of the magnetic members, when the primary frame 104 is magnetically coupled to the auxiliary frame 102, the auxiliary frame 102 is restricted from moving downwards relative to the primary frame 104. In one embodiment, one frame is restricted from moving downwards means that gravity helps the frame to be attached to the other frame; in another embodiment, one frame is restricted from moving downwards means that friction, due to gravity, helps the frame to be attached to the other frame. The enhancement is better illustrated in FIG. 4. The magnetic coupling of the magnetic members, 114 and 116, occurs at a coupling surface 130 on the primary frame 104. The coupling surface 130 is substantially perpendicular to the frontal plane 110. To be more specific, the angle between the coupling surface 130 and the frontal plane 110 is defined as the bridge angle 132. In one embodiment, the coupling surface 130 being substantially perpendicular to the frontal plane 110 means that the bridge angle 132 is approximately in the range of 135 degrees and 45 degrees. This range can increase with stronger magnets due to the advancement in the magnet technology. In another embodiment, the bridge angle is less than 90 degrees, but more than 45 degrees. In yet another embodiment, the bridge angle is between 90 degrees and 75 degrees.

Figure 4:
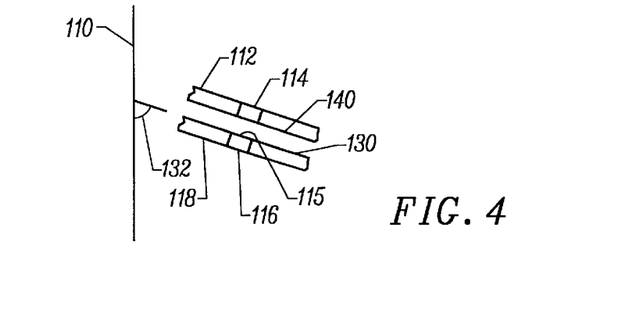
FIG. 4 illustrates the bridge angle of the first embodiment of the present invention.

In one embodiment, when the frames are coupled, the orientation of the coupling surface 130 at the primary frame is similar to the orientation of the auxiliary frame coupling surface 140, as shown in FIG. 4. In another embodiment, the surface of each magnetic member that is for magnetic coupling to another magnetic member is defined as a magnetic coupling surface, such as the surface 115. When the frames are coupled, the orientation of the magnetic coupling surface of the magnetic member 114 at the auxiliary frame is substantially the same as the orientation of the magnetic coupling surface of the magnetic member 116 at the primary frame. Matching the two orientations of the magnetic coupling surfaces enhances magnetic coupling between the two frames.

To further enhance coupling between the two frames, in one embodiment, the magnetic coupling surface of each magnetic member has no bumps, or is smooth. In the present invention, a bump is defined as a small structure on the magnetic coupling surface of a magnetic member that is bigger than 10 microns in any of its lateral dimensions and 10 microns high. Also, bumps are small structures that, due to its minute size, it is easy to randomly dispose more than one hundred of them on the magnetic coupling surface of a magnet.

In yet another embodiment, one of the magnetic members slightly protrudes from its coupling surface to ensure that, when the frames are attached together, the two magnetic members are in contact, instead of other areas at the coupling surfaces in contact. Again this enhances attachment of the two frames.

In a further embodiment, at least one of the magnetic members slightly recedes from its coupling surface, for example by ten microns. The receding prevents the magnetic members from touching each other when frames are coupled together. In one class of permanent magnets, if they are exposed to the atmosphere, corrosion can occur. To prevent corrosion, after the magnets are assembled into their corresponding bridges, the surfaces of the magnets exposed to the atmosphere are plated. Every time when the frames are coupled, if their corresponding magnetic members touch, as time goes by, the plating might be chipped, exposing the underlying magnets. This embodiment reduces the chance of corrosion by slightly receding at least one magnetic member from the coupling surface so that even with plating, the plated magnetic surfaces would not be in contact when the frames are coupled together. Then when frames are coupled, the magnetic members would be magnetically coupled, but not mechanically coupled, with other parts on the coupling surfaces mechanically coupled together.

If the auxiliary lenses are shades so that the first embodiment 100 acts as sunglasses, preferably, sun rays should be prevented from entering into the gap between the primary lenses and the secondary lenses. Due to the location of the magnetic members, the intrusion of sun rays in between the primary and the auxiliary frames is substantially reduced.

In the present invention, a magnetic member can be a permanent magnet or a magnetizable element, such as iron or magnetizable stainless steel. In one embodiment, a part is magnetizable if it can be attracted by a magnet. For magnetic coupling, at least one of the magnetic members is a permanent magnet. If both members are permanent magnets, but of opposite polarity at the coupling surface 130, the strength in magnetic coupling will be stronger.

Figure 5:
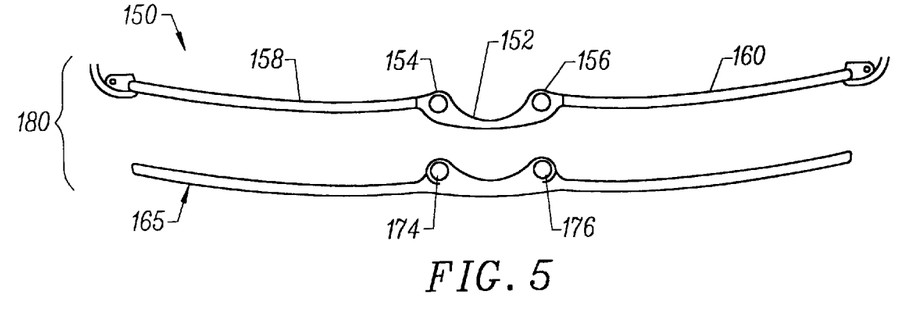
FIG. 5 shows the top view of the auxiliary frame and the primary frame in a second embodiment of the present invention.
Figure 6:
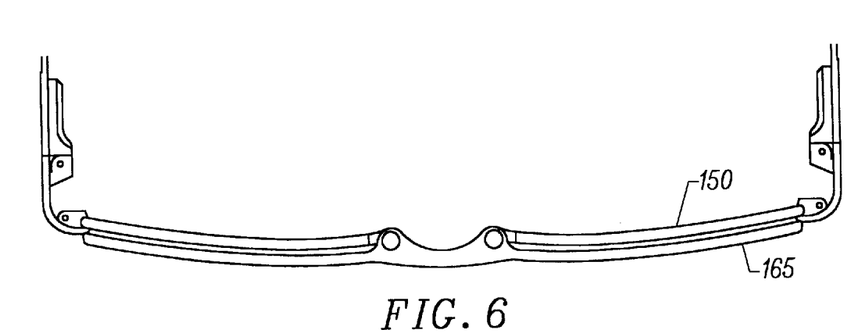
FIG. 6 shows the top view of the auxiliary frame attached to the primary frame in the second embodiment of the present invention.
Figure 7:
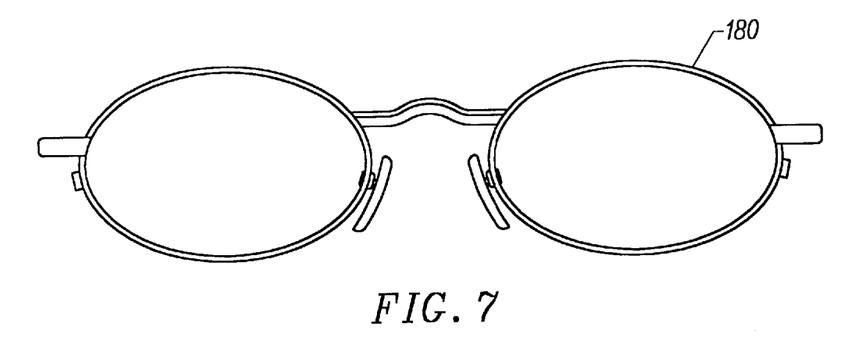
FIG. 7 shows the front view of the second embodiment.

FIG. 5 shows the top view of the primary frame 150 and the auxiliary frame 165 in a second embodiment 180 of the present invention. In this embodiment, the magnetic member at the bridge 152 of the primary frame 150 includes two separate parts, 154 and 156, with each part being adjacent to one of the retaining mechanisms; for example, the magnetic member part 154 can be adjacent to the retaining mechanism 158, and the magnetic member part 156 can be adjacent to the retaining mechanism 160. This enablement is applicable to bridges that are curved, as shown in FIG. 7. FIG. 6 shows the top view of the auxiliary frame 165 attached to the primary frame 150 in the second embodiment of the present invention. FIG. 7 shows the front view of this second embodiment 180.

In one embodiment, when coupled, the orientation of the magnetic members 174 and 176 at the auxiliary frame coupling surface is substantially the same as the orientation of the magnetic members 154 and 156 at the primary frame coupling surface, as in the first embodiment. Matching the orientations of the magnetic members enhances magnetic coupling between the two frames. In yet another embodiment, one set of the magnetic members slightly protrudes from their corresponding coupling surface to ensure that, when the frames are attached together, the magnetic members are in contact, instead of other areas at the coupling surfaces in contact. The set that protrudes can be both members from one frame, or one member from the auxiliary frame with the member not directly opposite to that member from the primary frame. The amount of protrusions from the two members should be substantially the same. Again this enhances attachment of the two frames. It is much easier to match the orientations of the magnetic members when they are located at the bridges, instead of much further apart on the frames, especially when typically frames are artistically curved, fitting the circumferential profile of a typical face.

Although the present invention has only illustrated a magnetic member with only one or two parts, it should be clear that a magnetic member can have more than two parts.

Figure 8:
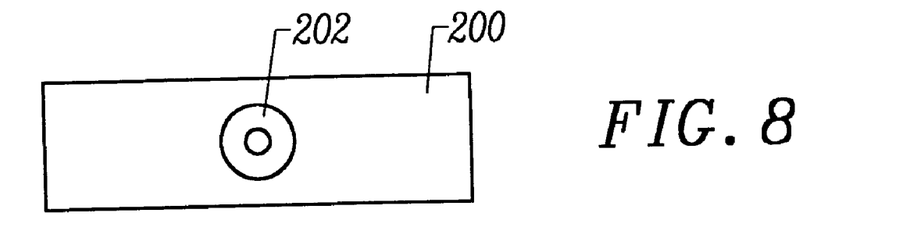
Figure 9A:
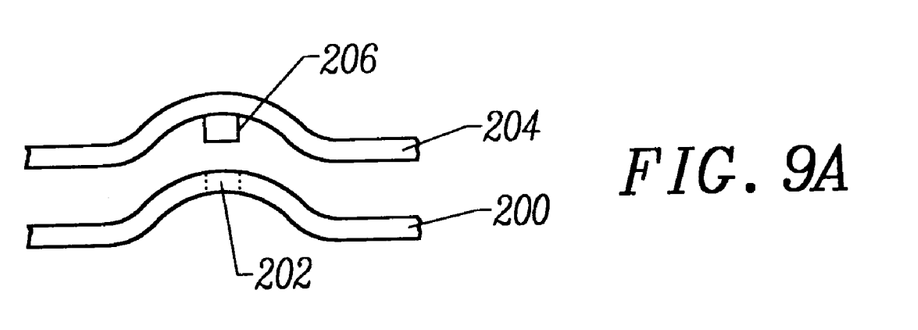
Figure 9B:
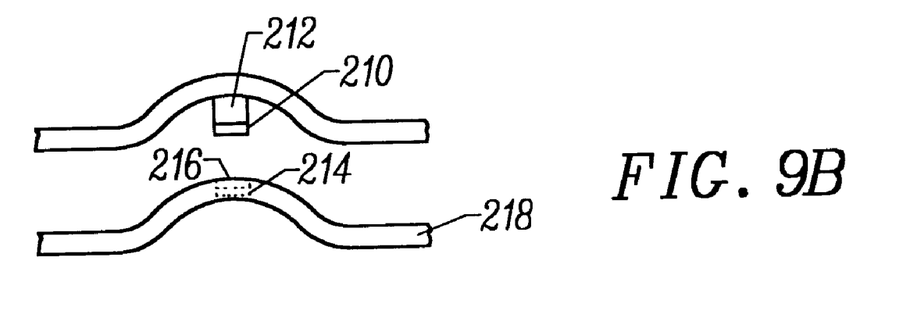

FIGS. 8–9A–B show embodiments of the present invention where the bridges include a cavity and a protrusion. FIG. 8 shows the top view of the bridge 200 of a primary frame, with a magnetic cavity member 202. In this example, the cavity is a ring, with the magnetic member lining the walls of the ring. However, in other examples, the cavity can be a square or of other shapes. FIG. 9A shows the front view of the bridge 204, with a magnetic protrusion member 206 that fits into the magnetic cavity member 202. The protrusion and the cavity further enhance the security of attachment of the auxiliary frame into the primary frame. In one embodiment, the wall of the ring 202 is a permanent magnet, while the protrusion is a magnetizable element 206, or vice versa. When coupled, at least a part of the protrusion fits into the cavity. In another embodiment, both the cavity walls and the protrusion are permanent magnets of opposite polarity. FIG. 9B shows another embodiment of the front view of the bridges with a cavity and a protrusion. In this embodiment, the magnetizable member is located at the distal part 210 of the protrusion 212, and at the bottom 214 of the cavity 216; the cavity does not go all the way through the bridge 218. Different combinations are applicable. For example, the cavity 216 is a magnetizable member, and the protrusion 212, not just its distal end, is a permanent magnet. In another example, a permanent magnet 214 sits at the bottom of the cavity 216, while the protrusion 212 is a magnetizable member.

In yet another embodiment, both the cavity walls and the protrusion are not permanent magnets, but the bridges include magnetic members such as those in the first or in the second embodiments. The protrusion and the cavity further improve the security in the attachment of the auxiliary frame to the primary frame. In this embodiment, again, the cavity can be similar to the cavity shown in FIG. 9B, where it does not have to go all the way through the bridge.

In one embodiment, the primary frame includes one or more magnetizable member, and the auxiliary frame includes one or more permanent magnets. The magnetic members are located as in either the first or the second embodiments. The bridge at the primary frame further includes a cavity to receive a protrusion located at the bridge of the auxiliary frame. The magnetic members with the protrusion and the cavity are located at the bridges, but are distributed apart for maximum mechanical strengths. For example, the magnetic members can be located as in the second embodiment with the cavity and the protrusion located at the center of the bridges, as in FIG. 9. As an example, the protrusion is made of nickel-silver, stainless steel or titanium, and is a rod that is about 1 mm long and about 1.5 mm in diameter.

Figure 10A:
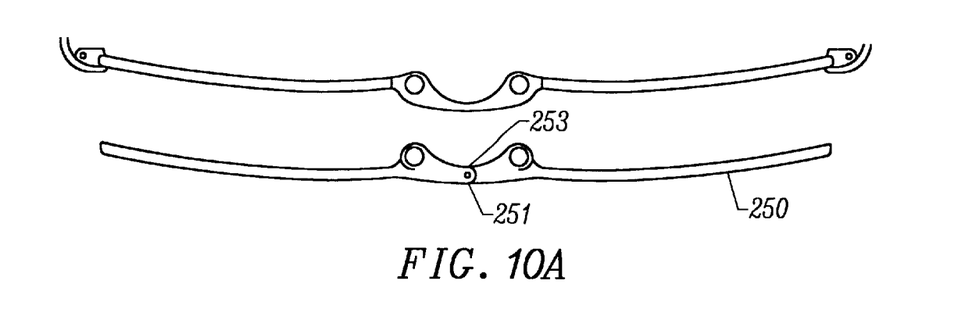
FIGS. 10A, 10B, 10C show an embodiment of the present invention with a hinge at the bridge.
Figure 10B:
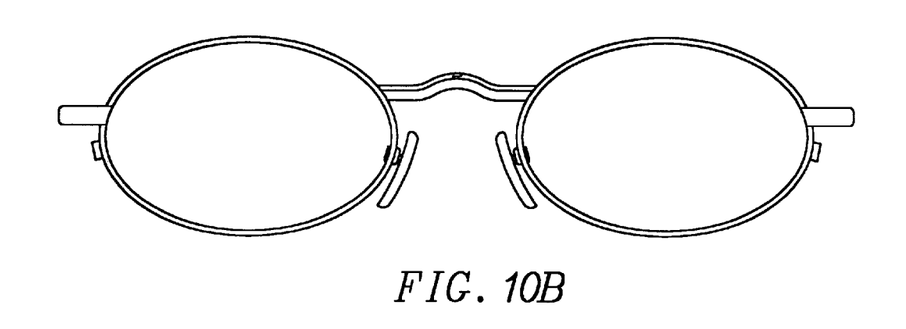
Figure 10C:
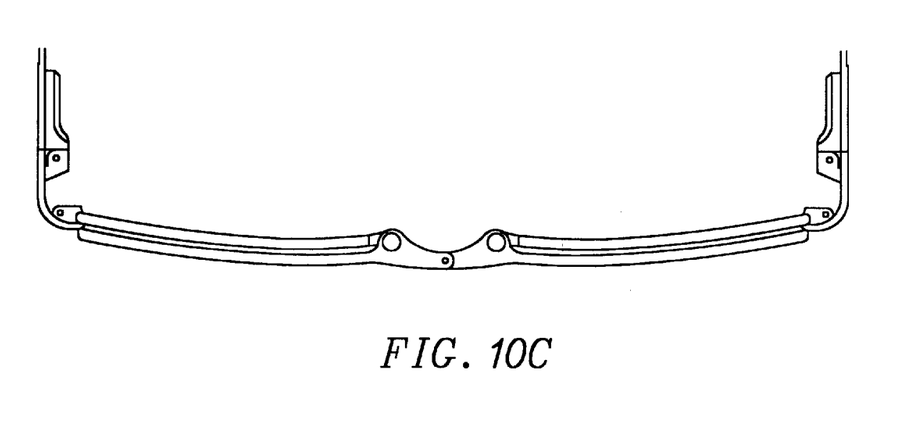

FIGS. 10A–C show an embodiment 250 of an auxiliary frame of the present invention with a hinge 251 at the bridge 253. FIG. 10A shows the top view of the auxiliary frame with a primary frame; FIGS. 10B–C show the front view and the top view of the auxiliary frame attached to the primary frame. One benefit of having a hinge is that the frame can be folded, which will save storage space for the auxiliary frame.

Figure 11:
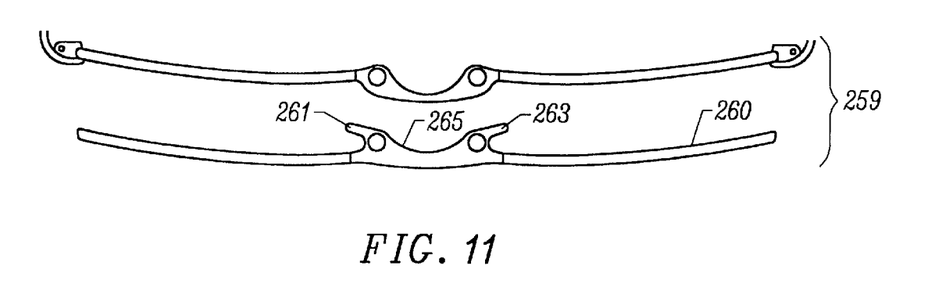
FIG. 11 shows an embodiment of the present invention with the bridge including lateral extensions.

FIG. 11 shows an embodiment 260 of an auxiliary frame of the present invention with the bridge including a flange that extends from the bridge of the frame to further secure the attachment of the auxiliary frame to a primary frame. This flange enhances attachment between the primary and the auxiliary frames, and can reduce the gap between the two frames. In FIG. 11, the flange includes two lateral extending parts, 261 and 263, each extending laterally from one end of the bridge 265.

Figure 12A:
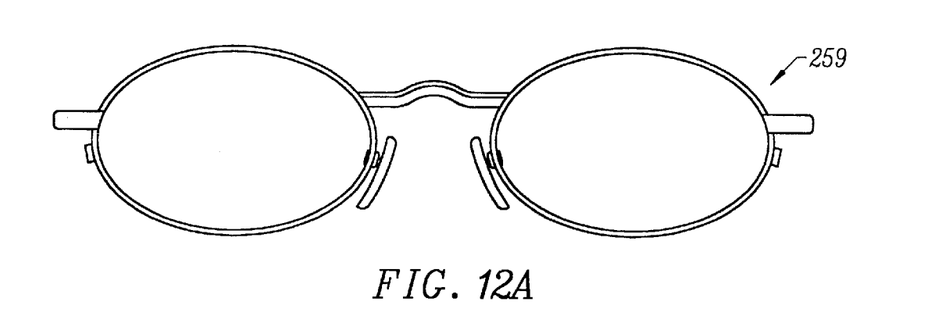
FIGS. 12A, 12B show an auxiliary frame with lateral extensions attached to a primary frame in the present invention.
Figure 12B:
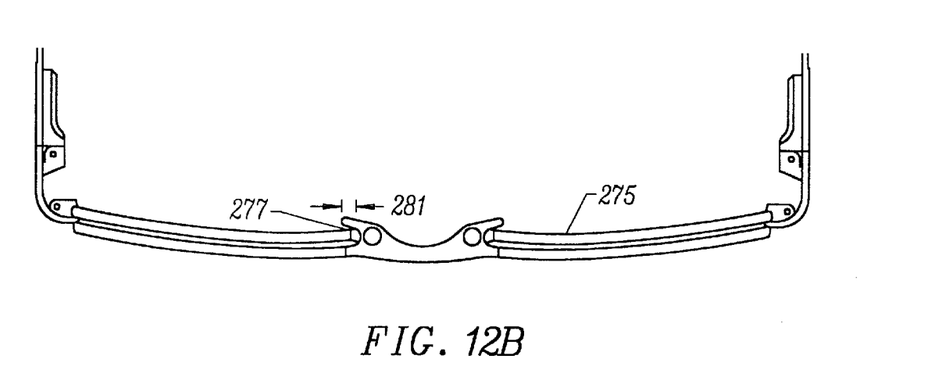

FIGS. 12A–B show the front view and the top view of the auxiliary frame with lateral extensions attached to a primary frame 275 in the present invention. When the auxiliary frame is attached to the primary frame, a portion of each retaining mechanism of the primary frame, such as the portion 277, is disposed between a portion of the retaining mechanism of the auxiliary frame and a portion of one lateral extension. The extensions further restrict the separation of the auxiliary frame from the primary frame after their attachment. Note that the auxiliary frame can still be easily attached to the primary frame with one hand even with the extensions. To prevent intrusion into the wearer's vision, the extensions are relatively short. In one embodiment, the length 281 of an extension is about 1 mm, and its thickness is the thickness of the bridge.

Figures 13, 14, 15:
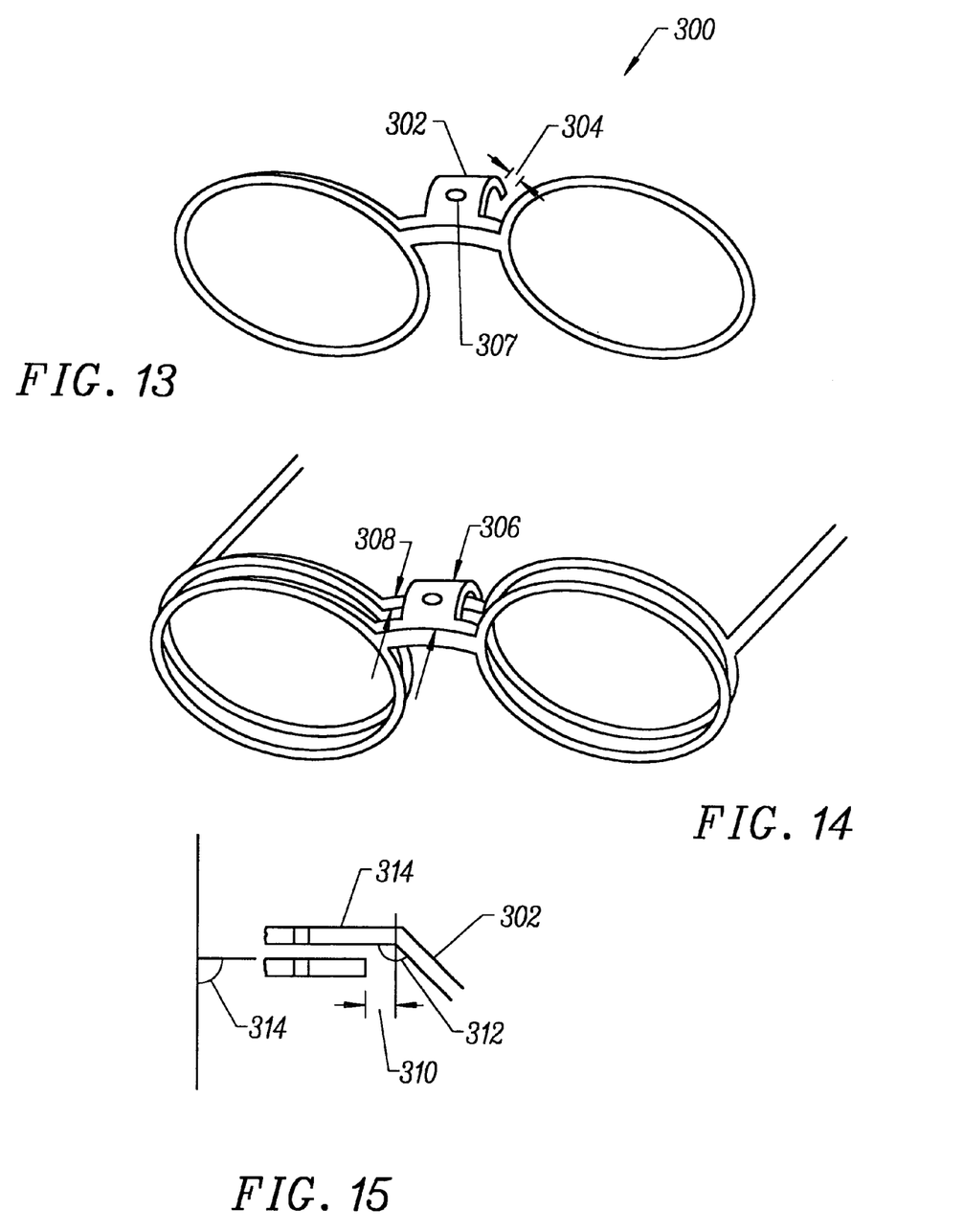
FIG. 13 shows an embodiment of the present invention with the bridge including a vertical extension.
FIG. 14 shows an auxiliary frame with a vertical extension attached to a primary frame in the present invention.
FIG. 15 illustrates the bridge angle and the extension angle of the embodiment of the present invention that has a vertical extension at the bridge.

FIG. 13 shows an embodiment of an auxiliary frame 300 of the present invention where the flange 302 is vertical relative to the bridge. For such a flange when the auxiliary frame 300 is attached to a primary frame, the bridge of the primary frame is disposed between frontal plane and the flange, as shown in FIG. 14. Again, the vertical flange further restricts the separation of the auxiliary frame from the primary frame after their attachment. Also the auxiliary frame can still be easily attached to the primary frame with one hand even with the vertical extension. In one embodiment, the length 304 of the extension 302 is about 1.5 mm, and its thickness is the thickness of the bridge.

The width 306 of the bridge of the auxiliary frame can be wider than the width 308 of the bridge of the primary frame. As an example, with the vertical flange, when the auxiliary frame is attached to the primary frame, there can be a gap 310 between the extension and the bridge of the primary frame, as shown in FIG. 15. In one embodiment, the gap is about 1 mm.

FIG. 15 also illustrates the bridge angle 314 and an extension angle 312 of the embodiment of the present invention that has a vertical extension at the bridge. In one embodiment, with the vertical flange, the bridge angle 314 is between about 30 degrees and 150 degrees. The extension angle 312 is defined as the angle between the vertical flange 302 and the bridge 314. In one embodiment, the extension angle is between 45 degrees and 135 degrees.

Figure 16:
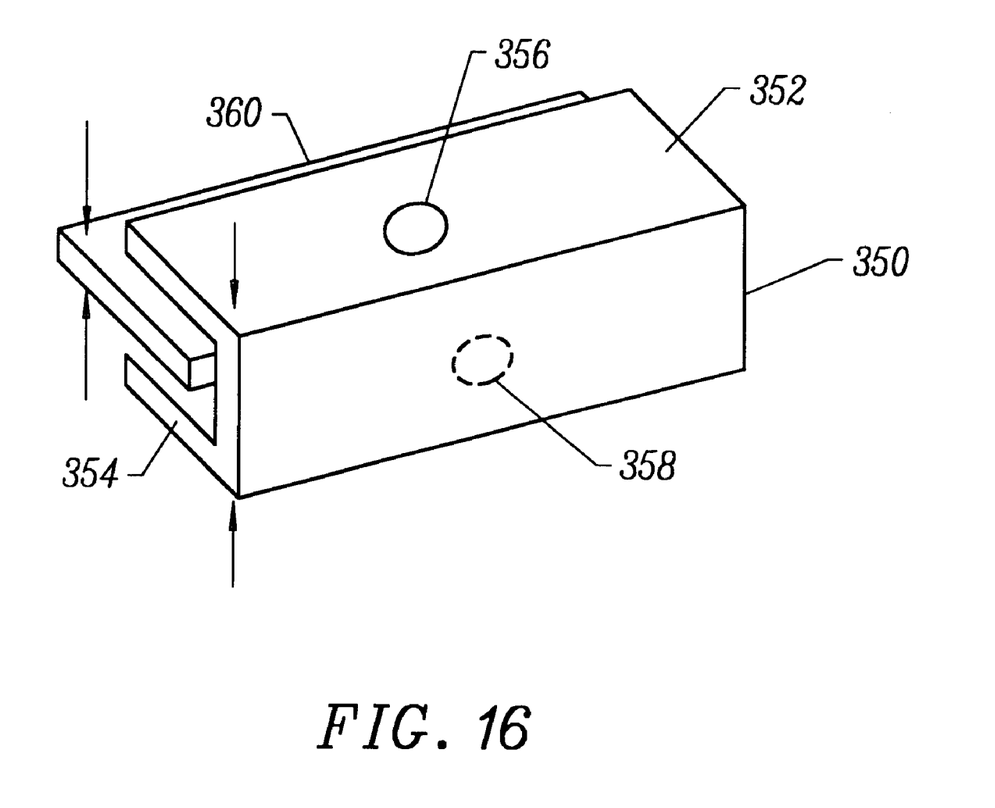
FIG. 16 shows another embodiment of the present invention where the bridge of the auxiliary frame includes a U-shaped structure having two arms.

FIG. 16 shows the bridges of yet another embodiment of the present invention where the bridge of the auxiliary frame includes a U-shaped structure 350 having two arms, 352 and 354, one on top and one on the bottom of the bridge 360 of the primary frame. In one embodiment, the magnetic member at the auxiliary frame includes two separate parts, with each part located at each arm of the U-shaped structure; for example, the member 358 at the arm 354, and the member 356 at the arm 352. Note that the members 356 and 358, each can further include more than one portion, as in the second embodiment. In another embodiment, the bottom arm 354 does not include any magnetic member. In yet another embodiment, the bridge 360 of the primary frame also includes its magnetic member, disposed at a location with the correct polarity with respect to the magnetic member of the auxiliary frame.

In the embodiment shown in FIG. 16, when the auxiliary frame is attached to the primary frame, the bridge 360 of the primary frame is sandwiched between the arms of the U-shaped structure 350. Typically, due to gravity, the magnetic member 356 at the top arm 352 of the auxiliary frame is magnetically coupled to the bridge of the primary frame, with a gap between the bottom arm and the bridge of the primary frame. As an example, the bridge of the primary frame is steel, with a thickness of about 1 mm, and the thickness of the U-shaped bridge is about 4 mm.

In one embodiment, each magnet is held in its corresponding frame by a housing, which is the immediate area of the frame encapsulating a part, typically a significant part, of the magnet. The size of each magnet is slightly larger than the housing holding it. Each magnet is incorporated into its housing on the frame through pressure insertion. To keep the magnet in its housing, the magnet is slightly larger than its housing. In one embodiment, at least in one lateral dimension, or one of the dimensions a housing holding its magnet, such as the diameter of a round magnet, slightly larger means that the difference in size between the magnet and the housing is between 5 microns and 180 microns.

In another embodiment, the edges of the magnetic coupling surface of each magnet are chamfered to remove any sharp corners. If magnets are plated after they have been installed into their respective housings, chamferring the edges improves step coverage in plating. In other words, plating on a magnet can be more smooth at the intersection between the magnet and its housing through chamferring. Also, chamferring replaces sharp corners with sloping corners. If a magnet is installed into its housing through pressure insertion, the slopping corners guide the magnet into its housing. One way to chamfer is by buffing.

Magnets used in this invention are selected to have sufficient magnetic power to couple the frames together. In one embodiment, the magnetic field strength of each magnet is between 2500 and 3500 gauss; in another, the field strength is more than 2500 gauss, but less than 6000 gauss. In one embodiment, each magnet has a magnetic coupling surface of more than 14 mm square and a thickness of more than 1 mm. In another embodiment, each magnet has a magnetic coupling surface of at least 14 mm square and a thickness of more than 2 mm. In yet another embodiment, each magnet has a magnetic coupling surface of at least 28 mm square and a thickness of more than 1 mm.

Different embodiments in the present invention can be combined in different ways. For example, the vertical flange can be combined with the lateral flanges. The hinge can be combined with the lateral flanges. Also, it should be obvious to those skilled in the art the methods to build each embodiment. This specification will not further describe different fabrication techniques.

Note that the different types of bridges as described, individually, is a different embodiment of the present invention. Also, different types of auxiliary frames and different forms of primary frames, individually, is also a different embodiment of the present invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. An eyeglass device comprising:
    a first frame including
        two retaining mechanisms for supporting a pair of lenses, and defining a frontal plane,
        a bridge connecting the two retaining mechanisms and holding the two retaining mechanisms together, and
        a first magnetic member at the bridge for magnetically coupling to another magnetic member at the bridge of a second frame;
    such that when coupled,
        the two frames are attached together,
        due to the locations of the magnetic members, one of the frames is restricted from moving downwards relative to the other frame, and
        the two magnetic members are coupled at a surface that is not parallel to the frontal phase.

2. An eyeglass device as recited in claim 1 wherein the coupling occurs at a coupling surface on the second frame that is substantially perpendicular to the frontal plane.

3. An eyeglass device as recited in claim 2 wherein when the two frames are coupled, the orientation of the magnetic member of the first frame is substantially the same as the orientation of the magnetic member of the second frame at the coupling surface.

4. An eyeglass device as recited in claim 2 wherein:
    the first frame includes a first-frame coupling surface; and
    the magnetic member of the first frame slightly protrudes from the first-frame coupling surface to enhance magnetic coupling when the two frames are coupled.

5. An eyeglass device as recited in claim 2 wherein at least one magnetic member slightly recedes from the coupling surface so that the two magnetic members magnetically, but not mechanically coupled, when the two frames are coupled together.

6. An eyeglass device as recited in claim 2 wherein:
    the surface of each magnetic member that is for magnetic coupling to another magnetic member is defined as a magnetic coupling surface; and
    the magnetic coupling surface of each magnetic member has no bumps to enhance coupling between the two frames.

7. An eyeglass device as recited in claim 2 wherein:
    the surface of the permanent magnet that is for magnetic coupling to another magnetic member is defined as a magnetic coupling surface; and
    the edges of the magnetic coupling surface are chamferred to remove any sharp corners.

8. An eyeglass device as recited in claim 2 wherein:
    the magnetic member at the bridge of the first frame is a permanent magnet;
    the permanent magnet has a magnetic field strength of at least 2500 gauss;
    the permanent magnet has a magnetic coupling surface, which is the surface the magnet magnetically couples to the magnetic member of the second frame;
    the magnetic coupling surface has a surface area of more than 14 mm square; and
    the height of the permanent magnet is more than 1 mm.

9. An eyeglass device as recited in claim 1 wherein the magnetic member at the bridge of the first frame is a permanent magnet.

10. An eyeglass device as recited in claim 9 wherein:
    the permanent magnet is partially encapsulated by a housing in the first frame; and
    the size of the permanent magnet is slightly larger than the size of the housing at least in one lateral dimension, which is a dimension that the housing is holding the magnet.

11. An eyeglass device as recited in claim 1 wherein the magnetic member at the bridge of the first frame comprises two separate parts, with each part being adjacent to one of the retaining mechanisms.

12. An eyeglass device as recited in claim 1 wherein:
    the bridge of the first frame further includes a U-shaped structure having two arms; and
    the magnetic member at the first frame is disposed at least on one of the arms;
    such that magnetic coupling occurs when the bridge of the second frame is sandwiched between the arms of the U-shaped structure.

13. An eyeglass device as recited in claim 1 wherein:
    the coupling occurs at a coupling surface on the second frame; and
    the angle between the coupling surface and the frontal plane is approximately between 135 degrees and 45 degrees.

14. An eyeglass device as recited in claim 1 wherein the first frame is an auxiliary frame to receive the second frame, which is a primary frame.

15. An eyeglass device as recited in claim 14 wherein the bridge of the auxiliary frame includes a hinge for folding the auxiliary frame.

16. An eyeglass device as recited in claim 15 wherein the magnetic member at the bridge of the auxiliary frame comprises two separate parts, with each part being adjacent to one of the retaining mechanisms.

17. An eyeglass device as recited in claim 14 wherein the auxiliary frame further includes a flange that extends from the bridge of the frame to further secure the attachment of the auxiliary frame to the primary frame.

18. An eyeglass device as recited in claim 17 wherein the flange includes two lateral extensions, each extending laterally from one end of the bridge;
    such that when the auxiliary frame is attached to the primary frame, a portion of each retaining mechanism of the primary frame is disposed between a portion of a retaining mechanism of the auxiliary frame and a portion of one lateral extension.

19. An eyeglass device as recited in claim 17 wherein the flange includes a vertical extension, extending vertically from the bridge;
    such that when the auxiliary frame is attached to the primary frame, the bridge of the primary frame is disposed between frontal plane and at least a portion of the extension.

20. An eyeglass device as recited in claim 19 wherein the width of the bridge of the auxiliary frame is wider than the width of the bridge of the primary frame so that when the auxiliary frame is attached to the primary frame, there can be a gap between the flange and the bridge of the primary frame.

21. An eyeglass device as recited in claim 17, wherein:

the flange includes an extension extending from the bridge; and the extension subtends an extension angle with the bridge of the auxiliary frame, such that the extension angle is between 45 and 135 degrees;

such that when the auxiliary frame is attached to the primary frame, the bridge of the primary frame is disposed between frontal plane and at least a portion of the extension.

22. An eyeglass device comprising:

a bridge connecting two retaining mechanism and holding them together, with the two mechanisms supporting a pair of lenses of a first frame; and a magnetic member at the bridge for magnetically coupling to another magnetic member at the bridge of a second frame;

such that:

the two retaining mechanisms defines a frontal plane; and when coupled, the two frames are attached together, due to the location of the magnetic members, one of the frames is restricted from moving downwards relative to the other frame; and the the two magnetic members are coupled at a surface that is not parallel to the frontal phase.

23. An eyeglass device as recited in claim 22 wherein the coupling occurs at a coupling surface on the second frame that is substantially perpendicular to the frontal plane.

24. An eyeglass device as recited in claim 22 wherein the magnetic member at the bridge of the first frame is a permanent magnet.

25. An eyeglass device as recited in claim 22 wherein the magnetic member at the bridge of the first frame comprises two separate parts, with each part being adjacent to one of the retaining mechanisms.

26. An eyeglass device comprising:

an auxiliary frame including two retaining mechanisms for supporting a pair of lenses, and defining a frontal plane, a bridge connecting the two retaining mechanisms and holding them together, and a magnetic member at the bridge; and a primary frame including two retaining mechanisms for supporting a pair of lenses, a bridge connecting the two retaining mechanisms and holding them together, and a magnetic member at the bridge for magnetically coupling to the magnetic member at the bridge of the auxiliary frame;

such that when coupled, the two frames are attached together, due to the location of the magnetic members, the auxiliary frame is restricted from moving downwards relative to the primary frame; and the two magnetic members are coupled at a surface that is not parallel to the frontal phase.

27. An eyeglass device as recited in claim 26 wherein the coupling occurs at a coupling surface on the primary frame that is substantially perpendicular to the frontal plane.

28. An eyeglass device as recited in claim 26 wherein the magnetic member at the bridge of the auxiliary frame is a permanent magnet.

29. An eyeglass device as recited in claim 26 wherein each magnetic member at each bridge comprises two separate parts, with each part being adjacent to one of the retaining mechanisms of the corresponding frame.

30. An eyeglass device as recited in claim 26 wherein the auxiliary frame further includes a flange that extends from the bridge of the frame to further secure the attachment of the auxiliary frame to the primary frame.

31. An eyeglass device comprising:

a primary frame including two retaining mechanisms for supporting a pair of lenses, and defining a frontal plane, a bridge connecting the two retaining mechanisms, and holding them together, and a first magnetic member at the bridge for magnetically coupling to a second magnetic member at the bridge of an auxiliary frame;

such that when coupled, the two frames are attached together, due to the location of the magnetic members, the auxiliary frame is restricted from moving downwards relative to the primary frame; and the two magnetic members are coupled at a surface that is not parallel to the frontal phase.

32. An eyeglass device as recited in claim 31 wherein the coupling occurs at a coupling surface on the primary frame that is substantially perpendicular to the frontal plane.

33. An eyeglass device as recited in claim 31 wherein the magnetic member at the bridge of the primary frame is a magnetizable member.

34. An eyeglass device as recited in claim 31 wherein each magnetic member at each bridge comprises two separate parts, with each part being adjacent to one of the retaining mechanisms of the corresponding frame.

35. An eyeglass device as recited in claim 31 wherein the auxiliary frame further includes a flange that extends from the bridge of the auxiliary frame to further secure the attachment of the auxiliary frame to the primary frame, when the auxiliary frame is coupled to the primary frame.

* * * * *

(12) EX PARTE REEXAMINATION CERTIFICATE (8654th)

United States Patent
Chao et al.

(10) Number: US 6,012,811 C1
(45) Certificate Issued: *Nov. 8, 2011

(54) EYEGLASS FRAMES WITH MAGNETS AT BRIDGES FOR ATTACHMENT

(75) Inventors: David Chao, Towson, MD (US); Richard Chao, Chia Yi Hsien (TW)

(73) Assignee: Contour Optik, Inc., Chiayi (TW)

Reexamination Request:
No. 90/011,116, Jul. 26, 2010

Reexamination Certificate for:
Patent No.: 6,012,811
Issued: Jan. 11, 2000
Appl. No.: 08/963,299
Filed: Nov. 3, 1997

(*) Notice: This patent is subject to a terminal disclaimer.

Related U.S. Application Data

(63) Continuation-in-part of application No. 08/766,327, filed on Dec. 13, 1996, now Pat. No. 5,737,054, and a continuation-in-part of application No. 08/847,711, filed on Apr. 28, 1997, now Pat. No. 6,109,747, and a continuation-in-part of application No. 08/865,379, filed on May 29, 1997, now Pat. No. 5,786,880.

(51) Int. Cl.
*G02C 7/08* (2006.01)

(52) U.S. Cl. .............................................. 351/47; 351/57
(58) Field of Classification Search ........................ None
See application file for complete search history.

(56) References Cited

To view the complete listing of prior art documents cited during the proceeding for Reexamination Control Number 90/011,116, please refer to the USPTO's public Patent Application Information Retrieval (PAIR) system under the Display References tab.

*Primary Examiner*—My Trang Nu Ton (57) ABSTRACT

A first frame of an eyeglass device includes a bridge with a magnetic member, and two retaining mechanisms for supporting a pair of lenses. The retaining mechanisms defines a frontal plane. The bridge ties the two retaining mechanism together, with the magnetic member magnetically coupling to another magnetic member at the bridge of a second frame. In one embodiment the coupling occurs at a coupling surface on the second frame that is substantially perpendicular to the frontal plane. The magnetic member at the bridge of the first frame can be a permanent magnet or a magnetizable member. The second frame can be a primary frame, and the first frame can be an auxiliary frame.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-11, 13-17, 19, and 21-35 is confirmed.

Claims 12, 18 and 20 were not reexamined.

* * * * *